(12) United States Patent
Yoshioka et al.

(10) Patent No.: US 12,245,194 B2
(45) Date of Patent: Mar. 4, 2025

(54) USER EQUIPMENT

(71) Applicant: NTT DOCOMO, INC., Tokyo (JP)

(72) Inventors: Shohei Yoshioka, Tokyo (JP); Satoshi Nagata, Tokyo (JP); Huan Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 372 days.

(21) Appl. No.: 17/439,144

(22) PCT Filed: Mar. 20, 2019

(86) PCT No.: PCT/JP2019/011928
§ 371 (c)(1),
(2) Date: Sep. 14, 2021

(87) PCT Pub. No.: WO2020/188831
PCT Pub. Date: Sep. 24, 2020

(65) Prior Publication Data
US 2022/0159622 A1    May 19, 2022

(51) Int. Cl.
*H04W 72/02* (2009.01)
*H04L 1/08* (2006.01)
*H04W 72/044* (2023.01)
*H04W 72/0453* (2023.01)
(Continued)

(52) U.S. Cl.
CPC ............. *H04W 72/02* (2013.01); *H04L 1/08* (2013.01); *H04W 72/0453* (2013.01); *H04W 72/0466* (2013.01); *H04W 72/20* (2023.01); *H04W 92/18* (2013.01)

(58) Field of Classification Search
CPC ............. H04W 72/02; H04W 72/0453; H04W 72/0466; H04W 72/20; H04W 92/18; H04L 1/08; H04L 1/1861; H04L 1/1896
See application file for complete search history.

(56) References Cited

U.S. PATENT DOCUMENTS

| 11,405,144 B2 * | 8/2022 | Park ..................... H04L 1/1893 |
| 2020/0205165 A1 * | 6/2020 | Huang .................. H04L 1/1854 |
| 2020/0267597 A1 * | 8/2020 | Huang .................. H04W 76/14 |

(Continued)

OTHER PUBLICATIONS

Extended European Search Report in counterpart European Application No. 19 92 0036.1 issued Aug. 10, 2022 (9 pages).
(Continued)

*Primary Examiner* — Yu-Wen Chang
(74) *Attorney, Agent, or Firm* — Osha Bergman Watanabe & Burton LLP

(57) ABSTRACT

A user equipment includes a transmitting unit that transmits, to another user equipment, data through a physical shared channel; a control unit that identifies a resource in which a channel used for transmission and reception of a response related to retransmission control for the data is allocated; and a receiving unit that receives, from the another user equipment, the response related to the retransmission control for the data through the channel used for transmission and reception of the response related to the retransmission control, wherein the control unit identifies, based on a subchannel in which the physical shared channel is allocated, the resource in which the channel for receiving the response related to the retransmission control is allocated.

3 Claims, 14 Drawing Sheets

(51) Int. Cl.
*H04W 72/20* (2023.01)
*H04W 92/18* (2009.01)

(56) References Cited

U.S. PATENT DOCUMENTS

| | | | | |
|---|---|---|---|---|
| 2020/0305126 | A1* | 9/2020 | Li | H04L 1/1614 |
| 2020/0359375 | A1* | 11/2020 | Hwang | H04L 5/0055 |
| 2021/0288778 | A1* | 9/2021 | Park | H04L 1/1858 |
| 2022/0007403 | A1* | 1/2022 | Li | H04W 72/20 |
| 2022/0070829 | A1* | 3/2022 | Kusashima | H04L 1/1861 |
| 2022/0094481 | A1* | 3/2022 | Hong | H04L 1/1812 |
| 2022/0124679 | A1* | 4/2022 | Ye | H04W 72/20 |

OTHER PUBLICATIONS

ASUSTeK; "Discussion on sidelink physical layer procedure on NR V2X"; 3GPP TSG RAN WG1 #96, R1-1902445; Athens, Greece; Feb. 25-Mar. 1, 2019 (5 pages).

ITL; "Physical layer procedure for NR V2X"; 3GPP TSG RAN WG1 #96, R1-1902892; Athens, Greece; Feb. 25-Mar. 1, 2019 (5 pages).

Qualcomm Incorporated "Considerations on Physical Layer aspects of NR V2X"; 3GPP TSG RAN WG1 Meeting #94bis, R1-1811261; Chengdu, China; Oct. 8-12, 2018 (11 pages).

Kyocera; "A Reliable Groupcast HARQ feedback scheme for NR V2X"; 3GPP TSG-RAN WG1 #96, R1-1902132; Athens, Greece; Feb. 25-Mar. 1, 2019 (4 pages).

3GPP TSG RAN WG1 Ad-Hoc Meeting 1901; R1-1900714 "Discussion on NR sidelink physical layer procedure" Spreadtrum Communications; Taipei; Jan. 21-25, 2019 (6 pages).

3GPP TSG RAN WG1 Ad-Hoc Meeting 1901; R1-1900481 "Sidelink physical layer procedures for NR V2X communication" Intel Corporation; Taipei, Taiwan; Jan. 21-25, 2019 (17 pages).

3GPP TS 36.211 V15.3.0 "3rd Generation Partnership Project; Technical Specification Group Radio Access Network; Evolved Universal Terrestrial Radio Access (E-UTRA); Physical channels and modulation (Release 15)" Sep. 2018 (237 pages).

3GPP TR 22.886 V15.1.0 "3rd Generation Partnership Project; Technical Specification Group Services and System Aspects; Study on enhancement of 3GPP Support for 5G V2X Services (Release 15)" Mar. 2017 (58 pages).

International Search Report issued in International Application No. PCT/JP2019/011928, mailed Jun. 11, 2019 (4 pages).

Written Opinion issued in International Application No. PCT/JP2019/011928; Dated Jun. 11, 2019 (3 pages).

Office Action issued in European Application No. 19920036.1; Dated Oct. 10, 2024 (6 pages).

* cited by examiner

FIG.1
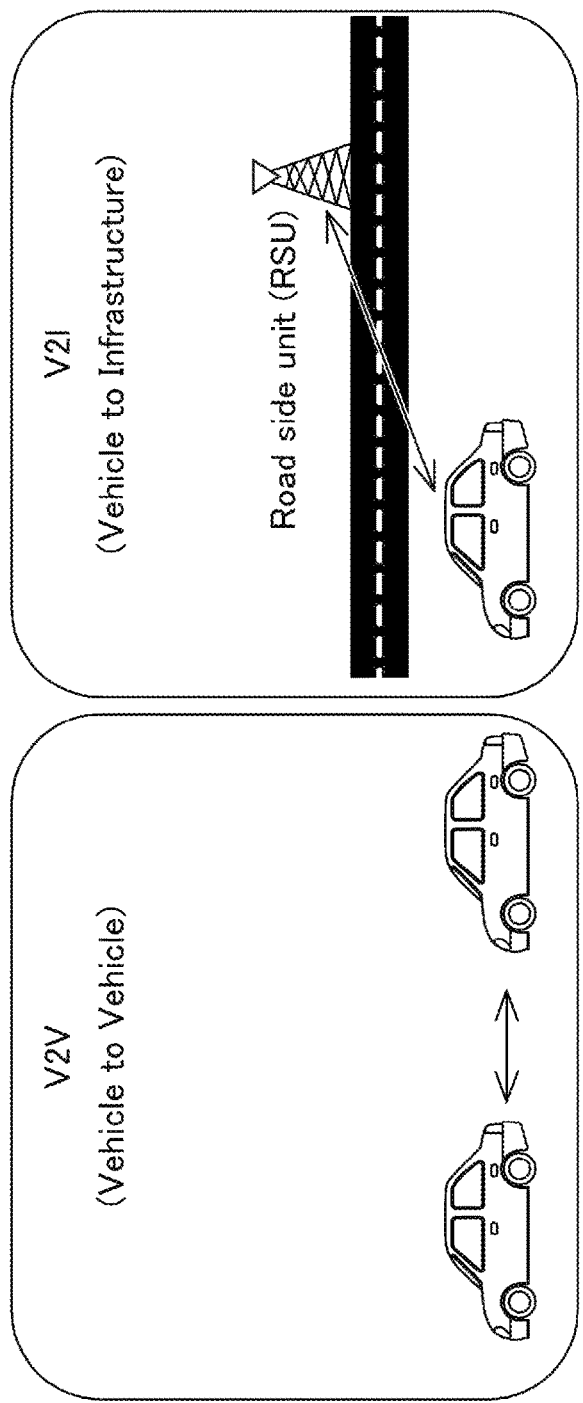
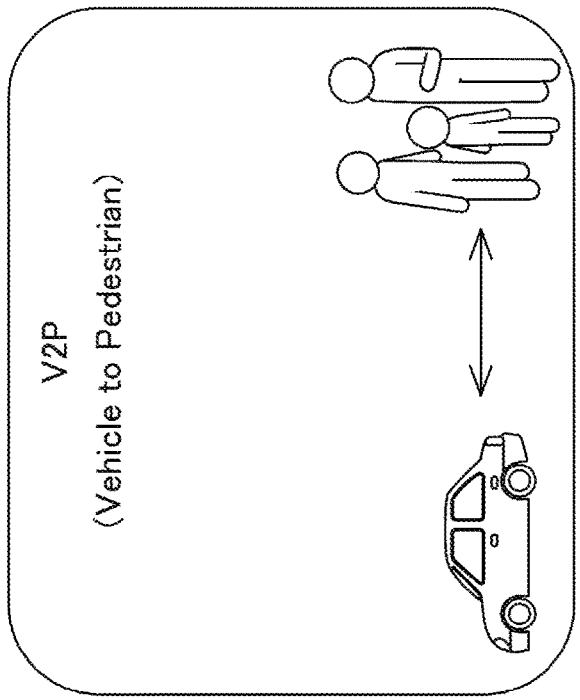
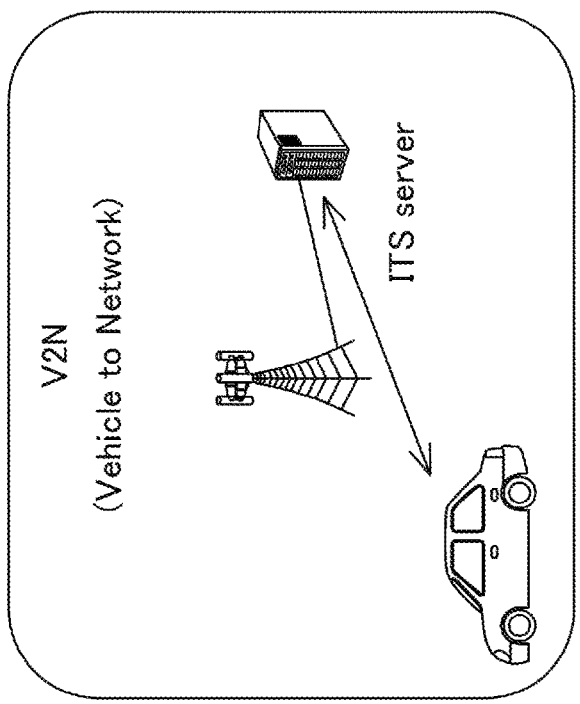

USER EQUIPMENT

TECHNICAL FIELD

The present invention relates to user equipment in a radio communication system.

BACKGROUND ART

For Long Term Evolution (LTE) and LTE successor systems (e.g., LTE Advanced (LTE-A), New Radio (NR) (which is also referred to as 5G), Device to Device (D2D) technology has been studied in which units of user equipment communicate directly with each other without going through a base station apparatus (e.g., Non-Patent Document 1).

D2D reduces traffic between user equipment and a base station apparatus, and D2D allows communication between units of user equipment, even if a base station apparatus is unable to communicate during a disaster or the like. In 3rd Generation Partnership Project (3GPP), D2D is referred to as "sidelink." However, in this specification, a more generic term, D2D, is used. Note that, in the embodiments described below, "sidelink" is also used, as necessary.

D2D communication is broadly classified into D2D discovery (which may also be referred to as D2D discovery or D2D detection) for detecting another unit of user equipment that is capable of communicating; and D2D communication (which may also be referred to as D2D direct communication, D2D communication, inter-terminal direct communication, or the like) for direct communication between units of user equipment. In the following, if D2D communication, D2D discovery, and the like are not particularly distinguished, they are simply referred to as D2D. Furthermore, signals transmitted and received in D2D are referred to as D2D signals. Various use cases of services related to NR Vehicle to Everything (V2X) have been studied (e.g., Non-Patent Document 2).

RELATED ART DOCUMENT

Non-Patent Document

Non-Patent Document 1: 3GPP TS 36.211 V15.3.0(2018-09)
Non-Patent Document 2: 3GPP TR 22.886 V15.1.0(2017-03)

SUMMARY OF THE INVENTION

Problem to be Solved by the Invention

It has been studied to support a Hybrid automatic repeat request (HARQ) for inter-terminal direct communication in NR-V2X. However, a resource in which Physical Sidelink Feedback Channel (PSFCH) for transmitting a HARQ response is allocated has not been specified, or no temporal gap between a Physical Sidelink Shared Channel (PSSCH) and a PSFCH has been specified.

The present invention has been accomplished in view of the above-described point, and an object is for appropriately transmitting a response related to retransmission control in inter-terminal direct communication.

Means for Solving the Problem

According to the disclosed technology, there is provided a user equipment including a transmitting unit that transmits, to another user equipment, data through a physical shared channel; a control unit that identifies a resource in which a channel used for transmission and reception of a response related to retransmission control for the data is allocated; and a receiving unit that receives, from the another user equipment, the response related to the retransmission control for the data through the channel used for transmission and reception of the response related to the retransmission control, wherein the control unit identifies, based on a subchannel in which the physical shared channel is allocated, the resource in which the channel for receiving the response related to the retransmission control is allocated.

Advantage of the Invention

According to the disclosed technology, a response related to retransmission control can be appropriately transmitted in inter-terminal direct communication.

BRIEF DESCRIPTION OF DRAWINGS

FIG. 1 is a diagram for illustrating V2X.

EMBODIMENTS OF THE INVENTION

Figure 2:
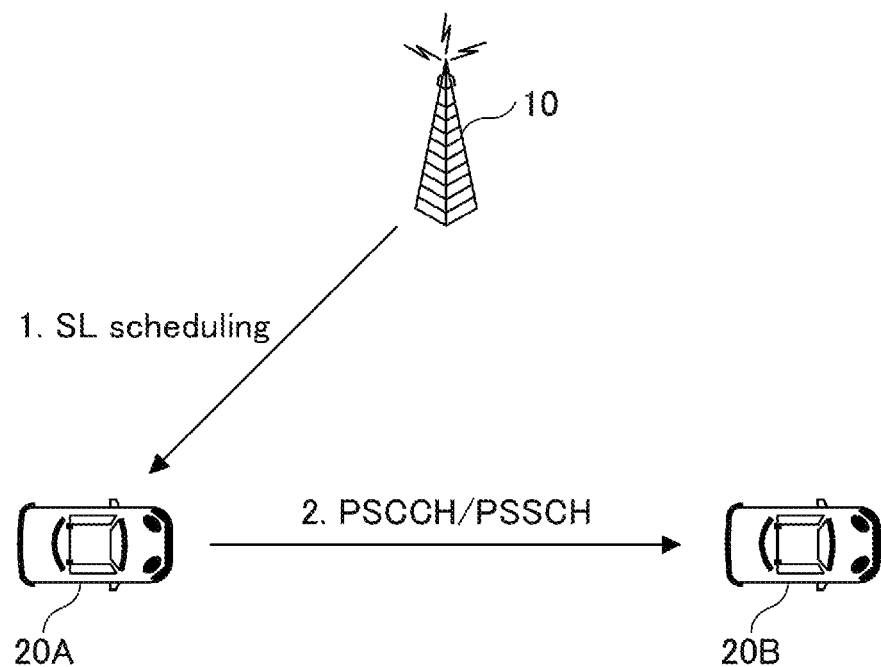
FIG. 2 is a diagram for illustrating an example (1) of a transmission mode of V2X.

In the following, embodiments of the present invention are described in reference to the drawings. The embodiments described below are examples, and embodiments to which the present invention is applied are not limited to the following embodiments.

In an operation of a radio communication system of the embodiments of the present invention, existing technology is appropriately used. Here, the existing technology is, for example, existing LTE but not limited to existing LTE. Further, the term "LTE" used in this specification has a broad meaning including LTE-Advanced and a system subsequent to LTE-Advanced (for example, NR), or a wireless Local Area Network (LAN) unless as otherwise specified.

In the embodiments of the present invention, a duplex method may be a Time Division Duplex (TDD) method, a Frequency Division Duplex (FDD) method, or any other method (e.g., Flexible Duplex, or the like).

Furthermore, in an embodiment of the present invention, when a radio parameter or the like is "configured", it may mean that a predetermined value is "pre-configured" or it may mean that a radio parameter provided by notification from the base station apparatus 10 or the user equipment 20 is configured.

FIG. 1 is a diagram for illustrating V2X. In 3GPP, implementation of vehicle to everything (V2X) or enhanced V2X (eV2X) by extending a D2D function has been studied, and technical specification documentation development thereof is in progress. As illustrated in FIG. 1, V2X is a part of intelligent transport systems (ITS) and is a generic term of vehicle to vehicle (V2V) meaning a communication mode performed between vehicles, vehicle to infrastructure (V2I) meaning a communication mode performed between a vehicle and a road-side unit (RSU) installed on a road side, vehicle to Network (V2N) meaning a communication mode performed between a vehicle and an ITS server, and vehicle to pedestrian (V2P) meaning a communication mode performed between a vehicle and a mobile terminal carried by a pedestrian.

Furthermore, in 3GPP, V2X has been studied that uses cellular communication and inter-terminal communication according to LTE or NR. V2X using cellular communication may be referred to as cellular V2X. For NR V2X, a study has been progressed to achieve a large capacity, low latency, high reliability, and Quality of Service (QoS) control.

It is assumed that, in V2X according to LTE or NR, a study that is not limited to the 3GPP specification will be progressed. For example, it is expected that the following items will be studied: ensuring interoperability; cost efficiency for implementing a higher layer; combining or switching multiple Radio Access Technologies (RATs); supporting regulations in each country; and data retrieving, delivering, database management, and use of a V2X platform according to LTE or NR.

In the embodiments of the present invention, a form in which the communication device is installed on a vehicle is mainly assumed, but embodiments of the present invention are not limited to this form. For example, the communication device may be a terminal carried by a person, the communication device may be a device installed in a drone or an aircraft, and the communication device may be a base station, an RSU, a relay station (relay node), a user equipment provided with scheduling capability, or the like.

Note that sidelink (SL) may be distinguished from uplink (UL) or downlink (DL) based on one of the following 1) to 4) or a combination thereof. Furthermore, SL may have any other name.

1) A resource allocation in a time domain
2) A resource allocation in a frequency domain
3) A synchronization signal to be referred to (including a sidelink synchronization signal (SLSS))
4) A reference signal used for path loss measurement for transmission power control.

Furthermore, for orthogonal frequency division multiplexing (OFDM) of SL or UL, any one of cyclic-prefix OFDM (CP-OFDM), discrete Fourier transform-spread-OFDM (DFT-S-OFDM), OFDM without transform precoding, and OFDM with transform precoding may be applied.

In SL of LTE, Mode 3 and Mode 4 are specified for SL resource allocation to the user equipment 20. In Mode 3, transmission resources are dynamically allocated in accordance with downlink control information (DCI) transmitted from the base station apparatus 10 to the user equipment 20. In Mode 3, semi-persistent scheduling (SPS) can be performed as well. In Mode 4, the user equipment 20 autonomously selects transmission resources from a resource pool.

A slot in an embodiment of the present invention may be replaced with a symbol, a mini slot, a subframe, a radio frame, a transmission time interval (TTI), or the like. Furthermore, a cell in an embodiment of the present invention may be replaced with a cell group, a carrier component, a BWP, a resource pool, a resource, a Radio Access Technology (RAT), or a system (including a wireless LAN).

FIG. 2 is a diagram for illustrating an example (1) of transmission mode of V2X. In a sidelink communication transmission mode illustrated in FIG. 2, in step 1, the base station apparatus 10 transmits sidelink scheduling to user equipment 20A. Subsequently, the user equipment 20A transmits a Physical Sidelink Control Channel (PSCCH) and a Physical Sidelink Shared Channel (PSSCH) to the user equipment 20B based on the received scheduling (step 2). The transmission mode of the sidelink communication illustrated in FIG. 2 may be referred to as a sidelink transmission mode 3 in LTE. The sidelink transmission mode 3 in LTE performs Uu-based sidelink scheduling. Uu is a radio interface between Universal Terrestrial Radio Access Network (UTRAN) and User Equipment (UE). Note that the transmission mode of sidelink communication illustrated in FIG. 2 may be referred to as a sidelink transmission mode 1 in NR.

Figure 3:
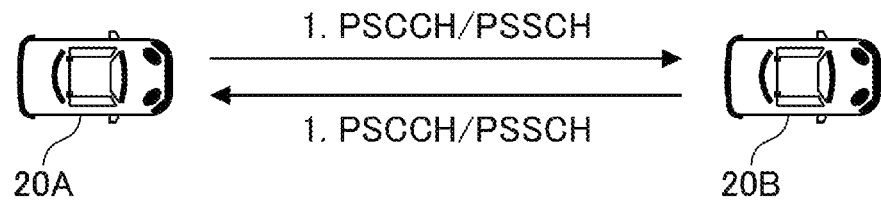
FIG. 3 is a diagram for illustrating an example (2) of a transmission mode of V2X.

FIG. 3 is a diagram for illustrating an example (2) of transmission mode of V2X. In a sidelink communication transmission mode illustrated in FIG. 3, in step 1, the user equipment 20A transmits PSCCH and PSSCH to the user equipment 20B using an autonomously selected resource. Similarly, the user equipment 20B transmits PSCCH and PSSCH to the user equipment 20A using an autonomously selected resource (step 1). The transmission mode of the sidelink communication illustrated in FIG. 3 may be referred to as a sidelink transmission mode 2a in NR. In the sidelink transmission mode 2a in NR, the UE itself performs resource selection.

Figure 4:
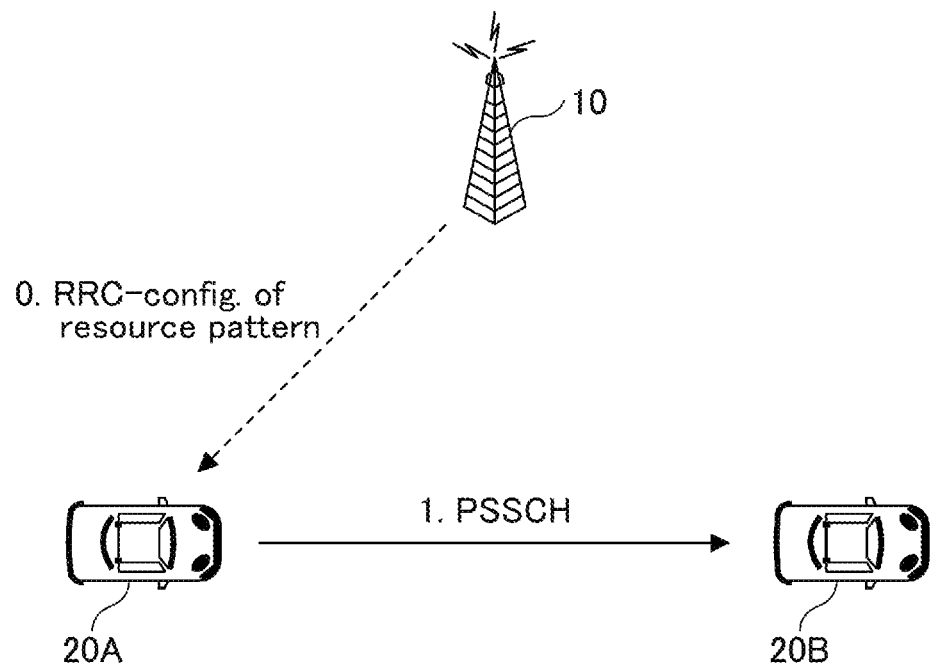
FIG. 4 is a diagram for illustrating an example (3) of a transmission mode of V2X.

FIG. 4 is a diagram for illustrating an example (4) of transmission mode of V2X. In the sidelink communication transmission mode illustrated in FIG. 4, in step 0, the base station apparatus 10 transmits a resource pattern of a sidelink to the user equipment 20A via a Radio Resource Control (RRC) configuration. Subsequently, the user equipment 20A transmits PSSCH to the user equipment 20B based on the received resource pattern (step 1). The transmission mode of sidelink communication illustrated in FIG. 4 may be referred to as a sidelink transmission mode 2c in NR.

Figure 5:
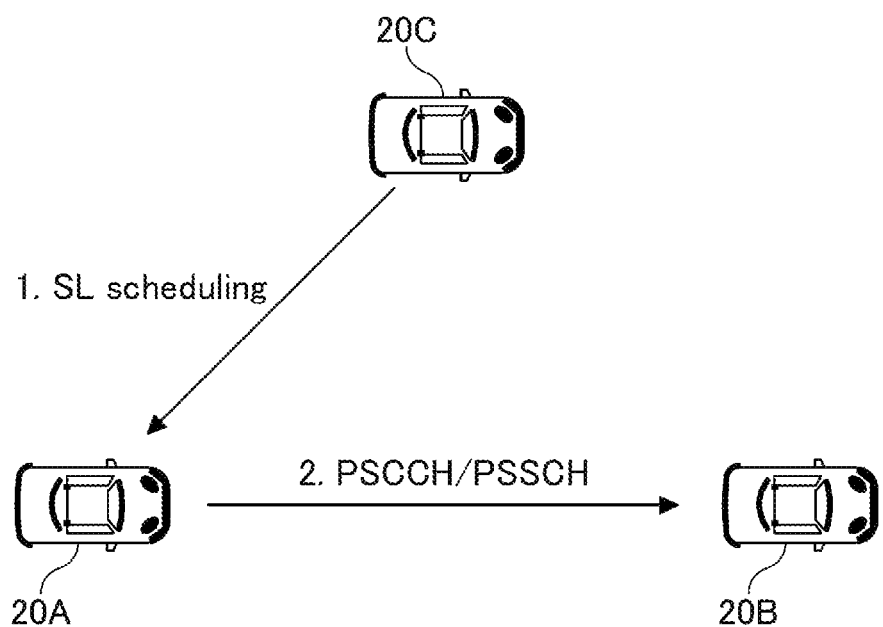
FIG. 5 is a diagram for illustrating an example (4) of a transmission mode of V2X.

FIG. 5 is a diagram for illustrating an example (5) of transmission mode of V2X. In a sidelink communication transmission mode illustrated in FIG. 5, in step 1, the user equipment 20C transmits sidelink scheduling to the user equipment 20A via PSCCH. Subsequently, the user equipment 20A transmits PSSCH to the user equipment 20B based on the received scheduling (step 2). The transmission mode of the sidelink communication illustrated in FIG. 5 may be referred to as a sidelink transmission mode 2d in NR.

Figure 6:
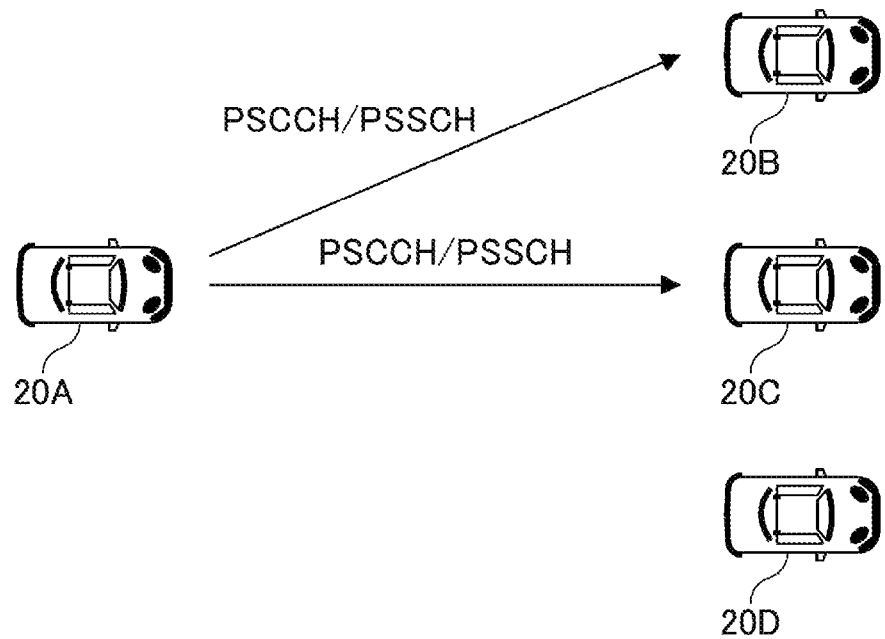
FIG. 6 is a diagram for illustrating an example (1) of a V2X communication type.

FIG. 6 is a diagram for illustrating an example (1) of a communication type of the V2X. The type of the sidelink communication illustrated in FIG. 6 is unicast. A user equipment 20A transmits the PSCCH and the PSSCH to the user equipment 20. In the example illustrated in FIG. 6, the user equipment 20A performs unicast to a user equipment 20B and also performs unicast to a user equipment 20C.

Figure 7:
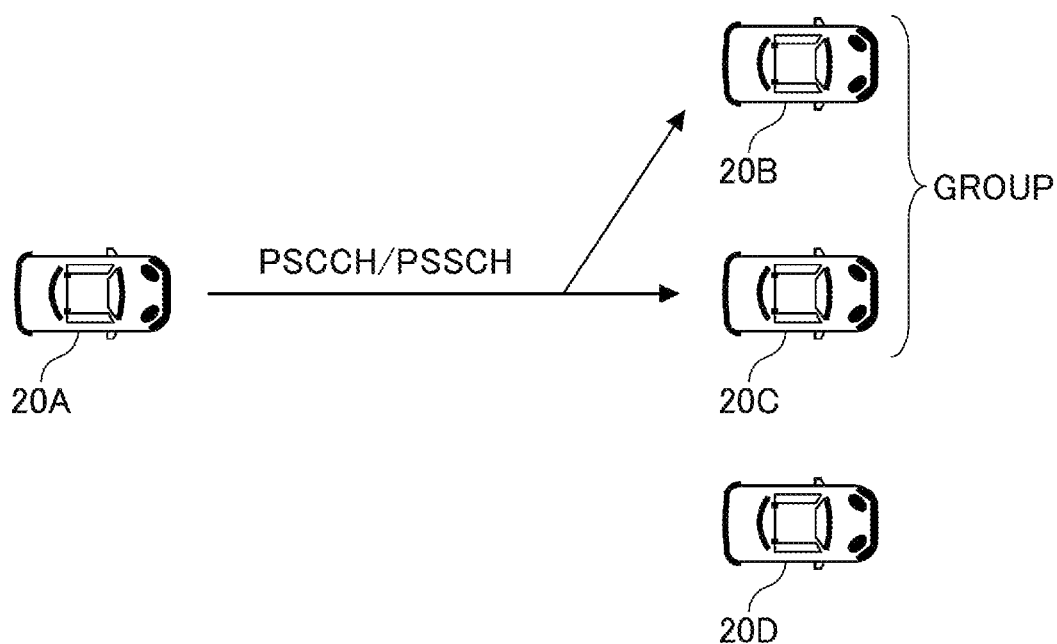
FIG. 7 is a diagram for illustrating an example (2) of a V2X communication type.

FIG. 7 is a diagram for illustrating an example (2) of the communication type of V2X. The type of the sidelink communication illustrated in FIG. 7 is groupcast. The user equipment 20A transmits the PSCCH and the PSSCH to a group to which one user equipment 20 or a plurality of units of the user equipment 20 belongs. In the example illustrated in FIG. 7, the group includes the user equipment 20B and the user equipment 20C, and the user equipment 20A performs the groupcast to the group.

Figure 8:
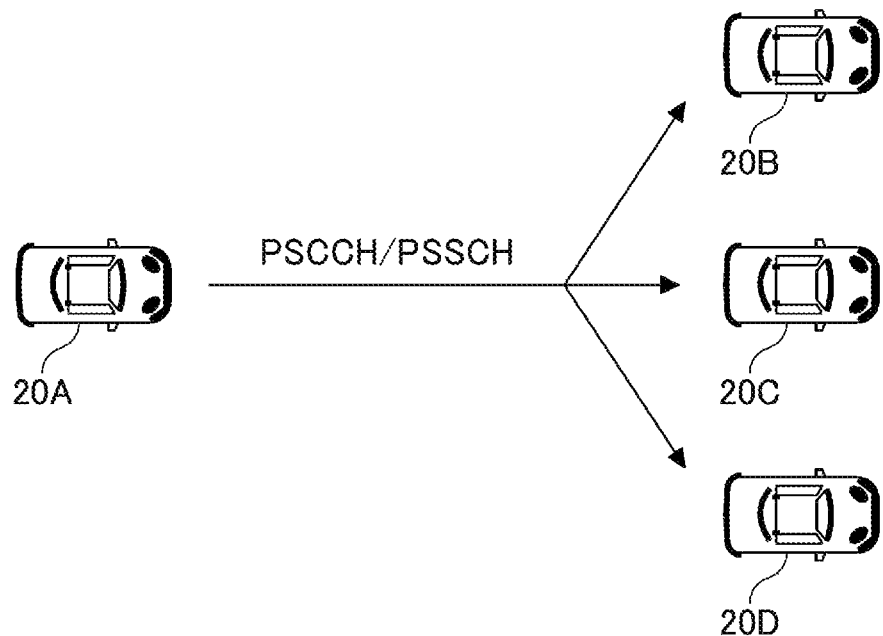
FIG. 8 is a diagram for illustrating an example (3) of a V2X communication type.

FIG. 8 is a diagram for illustrating an example (3) of the communication type of the V2X. The type of the sidelink communication illustrated in FIG. 8 is broadcast. The user equipment 20A transmits the PSCCH and the PSSCH to one or a plurality of units of the user equipments 20. In the example illustrated in FIG. 8, the user equipment 20A performs broadcast to the user equipment 20B, the user equipment 20C, and a user equipment 20D.

Figure 9:
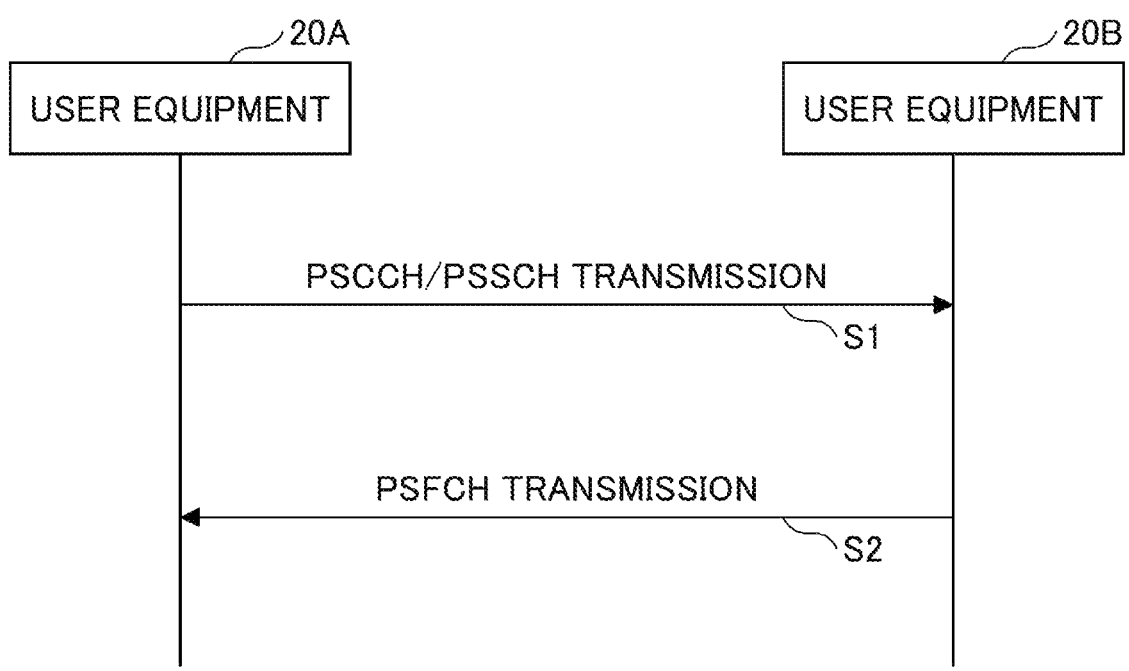
FIG. 9 is a flowchart for illustrating an example of an HARQ response in V2X.

FIG. 9 is a flowchart for illustrating an example of an HARQ response in the V2X. As illustrated in FIG. 9, in step S1, the user equipment 20A transmits the PSCCH and the PSSCH to the user equipment 20B. Subsequently, the user equipment 20B transmits a physical sidelink feedback channel (PSFCH) including the HARQ response corresponding to the received PSSCH to the user equipment 20A.

In the NR-V2X, the HARQ is supported for the PSCCH and the PSSCH for the unicast or the groupcast. In the unicast and the groupcast, HARQ feedback and HARQ combining are supported on the physical layer. In addition, in the NR-V2X, sidelink feedback control information (SFCI) including the HARQ response is defined. At least one SFCI format including the HARQ response corresponding to the PSSCH is applied to the SFCI.

In order to determine a resource of the PSFCH including the HARQ feedback, a time gap between the PSSCH and the PSFCH associated with the PSSCH is not signaled through the PSCCH at least in the transmission modes 2a, 2c, and 2d that are supported. In addition, for a time gap between the PSFCH transmitted in the transmission mode 1 and the transmission mode 2 (transmission mode 2 may be any one of the transmission mode 2a, the transmission mode 2c, and the transmission mode 2d, and hereinafter, the same is applied) and the PSSCH associated with the PSFCH, a notification of a configuration is transmitted, or a configuration is predefined. In addition, in the sidelink HARQ feedback, a PSFCH format that is allocated in the last several symbols of the slot that can be used in the sidelink is at least supported.

Herein, in a case where the PSFCH resources are allocated in the last several symbols of the slot, the allocation in the frequency domain or the code domain has not been clear. In addition, it has not been clear whether the PSFCH can be allocated in all slots.

Figure 10:
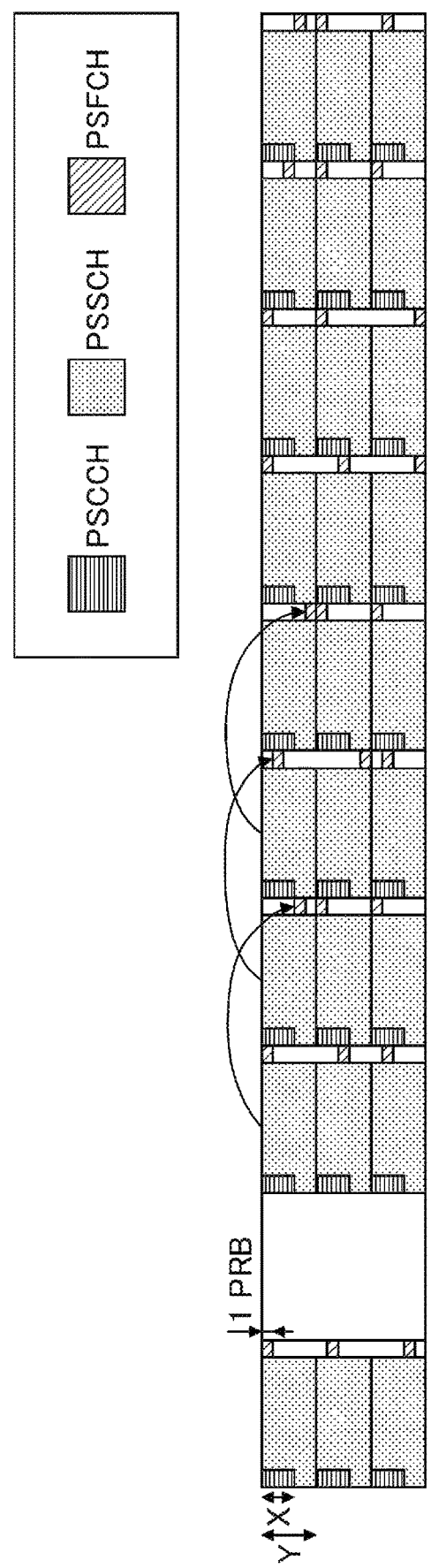
FIG. 10 is a diagram illustrating an example (1) of a channel allocation according to an embodiment of the present invention.

FIG. 10 is a diagram illustrating an example (1) of channel allocation in an embodiment of the present invention. In FIG. 10, the vertical axis corresponds to the frequency domain, the horizontal axis corresponds to the time domain, and one slot corresponds to the duration from the PSCCH to the next PSFCH. The PSCCH may be allocated in one symbol of the slot head, or may be allocated in the plurality of symbols from the head. The PSFCH may be allocated in the last one symbol of the slot or may be allocated in a plurality of the symbols from the end. As illustrated in FIG. 10, the candidate for the PSFCH resource may be allocated in all the slots. A notification of the resource in the frequency domain or the code domain where the PSFCH is allocated may be transmitted through the PSCCH by using sidelink control information (SCI). In addition, in a case where the PSFCH is allocated in a plurality of the symbols, a notification of the PSFCH resource in the time domain may be transmitted by using the SCI or the PSFCH resource in the time domain may be predefined. The arrows indicate the association between the PSSCH and the PSFCH. With respect to the time gap between the PSSCH and the PSFCH, as illustrated in FIG. 10, the PSFCH may be allocated in the next slot of the slot where the PSSCH is allocated.

"X" illustrated in FIG. 10 may indicate the number of physical resource blocks (PRBs) of the PSCCH, "Y" may indicate the number of PRBs in the PSSCH and/or the subchannel, and one PSFCH may be one PRB length. Although FIG. 10 illustrates a case in which the number of PRBs of the PSSCH and the number of PRBs of the subchannel are equal to each other, the present invention is not limited thereto. For example, the PSSCH may be allocated over a plurality of subchannels or the number of PRBs of the PSSCH may be less than the number of PRBs of one subchannel. In addition, although the subchannel is a unit formed of the plurality of PRBs and the subchannel-based resource selection/allocation is performed, the present invention is not limited thereto. That is, the "subchannel" according to the present invention may be replaced with, for example, a "carrier," a "BWP," or a "resource pool."

As illustrated in FIG. 10, all the PSFCH resources may be allocated in a frequency domain that is the same as a frequency domain of the subchannel of the PSSCH. As illustrated in FIG. 10, the PSFCH may be frequency-division-multiplexed, or the PSFCH may be code-division-multiplexed although not illustrated. In a case where the transmission of the PSFCH does not occur in a certain subchannel of a certain slot, the PSCCH or the PSSCH may be allocated in one symbol or a plurality of symbols from the end of the slot that is a candidate for the PSFCH resource in the subchannel. Alternatively, in a case where the transmission of the PSFCH does not occur in a certain slot, the PSCCH or the PSSCH may be allocated in one symbol or a plurality of symbols from the end of the slot that is a candidate for the PSFCH resource. Alternatively, in a case where the transmission of the PSFCH to the user equipment 20 does not occur in a certain slot and the transmission of the PSFCH does not occur in a certain subchannel of the slot, the PSCCH or the PSSCH where the user equipment 20 is the transmitting apparatus may be allocated in one symbol or a plurality of symbols from the end of the slot that is a candidate for the PSFCH resource in the subchannel. An overriding operation by which the PSCCH or the PSSCH described above is allocated in the PSFCH resource may be configured by RRC signaling or DCI signaling, or may be preconfigured.

In the case of the transmission mode 1, a notification of information indicating whether the PSCCH or the PSSCH can be allocated in one symbol or several symbols from the end of the slot may be transmitted by the SCI or the DCI. In the case of the transmission mode 2, the resource reservation signal may transmit a notification of the information on the allocation of the PSFCH resource, and by decoding the resource reservation signal by another user equipment 20, the other user equipment 20 can determine whether the PSCCH or the PSSCH can be allocated in one symbol or a plurality of symbols from the end of the slot.

Figure 11:
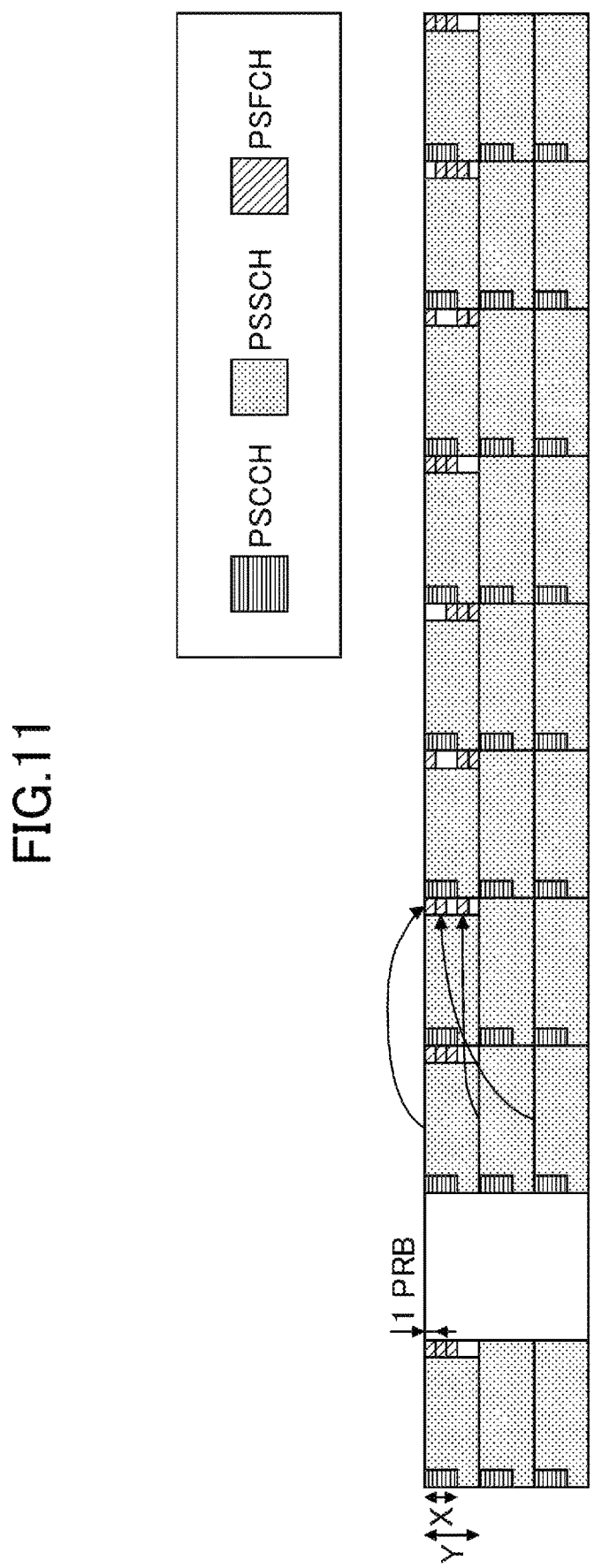
FIG. 11 is a diagram illustrating an example (2) of a channel allocation according to an embodiment of the present invention.

FIG. 11 is a diagram illustrating an example (2) of the channel allocation in an embodiment of the present invention. In FIG. 11, the vertical axis corresponds to the frequency domain, the horizontal axis corresponds to the time domain, and one slot corresponds to the duration from the PSCCH to the next PSFCH. The PSCCH may be allocated in one symbol of the slot head or may be allocated in a plurality of the symbols from the head. The PSFCH may be allocated in the last one symbol of the slot or may be allocated in a plurality of the symbols from the end. As illustrated in FIG. 11, the candidate for the PSFCH resource may be allocated in all the slots. A notification of the resource in the frequency domain or the code domain where the PSFCH is allocated may be transmitted using the SCI through the PSCCH. In addition, in a case where the PSFCH is allocated in a plurality of symbols, a notification of the PFSCH resource in the time domain may be transmitted by the SCI or may be predefined. The arrows indicate the association between the PSSCH and the PSFCH.

"X" illustrated in FIG. 11 indicates the number of PRBs of the PSCCH, "Y" indicates the number of PRBs of the PSSCH and/or the subchannel, and one PSFCH may be one PRB length. Although FIG. 11 illustrates a case in which the number of PRBs of the PSSCH and the number of PRBs of the subchannel are equal to each other, the present invention is not limited thereto. For example, the PSSCH may be allocated over a plurality of subchannels or the number of the PRBs of the PSCCH may be less than the number of PRBs of one subchannel.

In a case where the transmission of the PSFCH does not occur in a certain slot, the PSCCH or the PSSCH may be allocated in one symbol or a plurality of symbols (that is, the same symbol as the candidate for the PSFCH resource) from the end of the slot. Alternatively, in a case where the transmission of the PSFCH to a user equipment 20 does not occur in a certain slot, the PSCCH or the PSSCH where the user equipment 20 is the transmitting apparatus may be allocated in one symbol or a plurality of symbols (that is, the same symbol as the candidate for the PSFCH resource) from the end of the slot. As illustrated in FIG. 11, all the PSFCH resources may be allocated in the frequency domain of a specific subchannel of the PSSCH. As illustrated in FIG. 11, the PSFCH may be frequency-division-multiplexed, or the PSFCH may be code-division-multiplexed although not illustrated. In a subchannel other than the subchannel where the PSFCH is allocated, the PSCCH or the PSSCH may be allocated in the time domain where the PSFCH is allocated.

Figure 12:
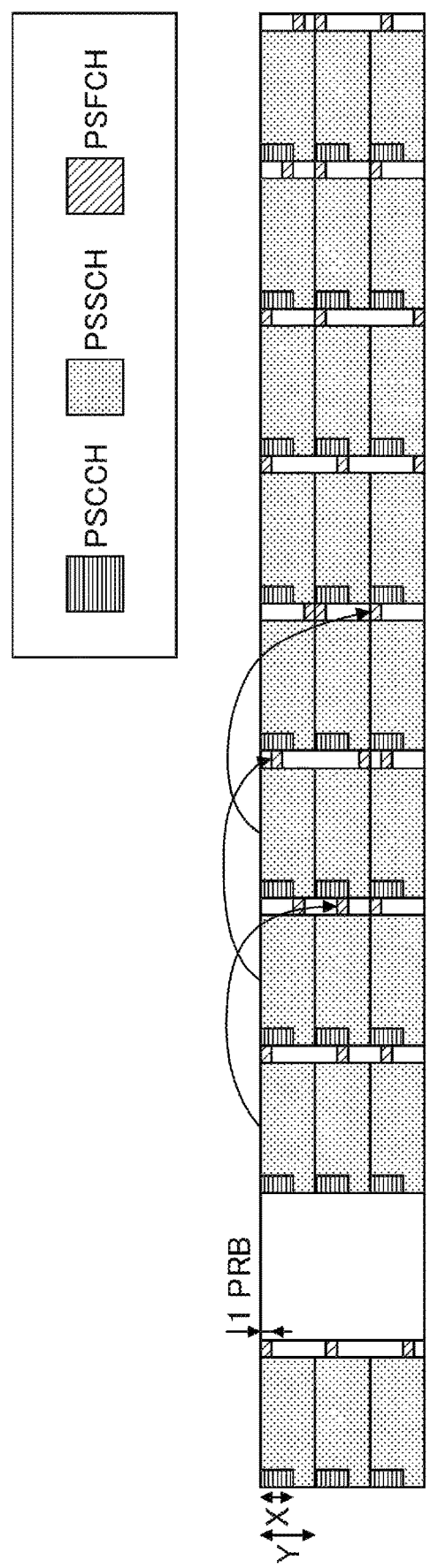
FIG. 12 is a diagram illustrating an example (3) of a channel allocation according to an embodiment of the present invention.

FIG. 12 is a diagram illustrating an example (3) of the channel allocation in an embodiment of the present invention. In FIG. 12, the vertical axis corresponds to the frequency domain, the horizontal axis corresponds to the time domain, and one slot corresponds to the duration from the PSCCH to the next PSFCH. The PSCCH may be allocated in one symbol of the slot head or may be allocated in the plurality of symbols from the head. The PSFCH may be allocated in the last one symbol of the slot or may be allocated in a plurality of the symbols from the end. As illustrated in FIG. 12, the candidate for the PSFCH resource may be allocated on all the slots. A notification of the resource in the frequency domain or the code domain where the PSFCH is allocated may be transmitted through the PSCCH by using the SCI. In addition, in a case where the PSFCH is allocated in a plurality of symbols, a notification of the PSFCH resource in the time domain may be transmitted by the SCI or the PSFCH resource in the time domain may be predefined. The arrows indicate the association between the PSSCH and the PSFCH.

"X" illustrated in FIG. 12 indicates the number of PRBs of the PSCCH, "Y" indicates the number of PRBs of the PSSCH and/or the subchannel, and one PSFCH may be one PRB length. Although FIG. 12 illustrates a case in which the number of PRBs of the PSSCH and the number of PRBs of the subchannel are equal to each other, the present invention is not limited thereto. For example, the PSSCH may be allocated over a plurality of subchannels or the number of the PRBs of the PSSCH may be less than the number of PRBs of one subchannel.

As illustrated in FIG. 12, regardless of the subchannel of the transmitted PSSCH, any one subchannel is selected from among all the subchannels of the PSSCH, and the PSFCH resource may be allocated in a frequency domain that is the same as a frequency domain of the subchannel. As illustrated in FIG. 12, the PSFCH may be frequency-division-multiplexed, or the PSFCH may be code-division-multiplexed although not illustrated. In a case where the transmission of the PSFCH does not occur in a certain subchannel of a certain slot, the PSCCH or the PSSCH may be allocated in one symbol or a plurality of symbols from the end of the slot that is a candidate for the PSFCH resource in the subchannel. Alternatively, in a case where the transmission of the PSFCH does not occur in a certain slot, the PSCCH or the PSSCH may be allocated in one symbol or a plurality of symbols from the end of the slot that is a candidate for the PSFCH resource. Alternatively, in a case where the transmission of the PSFCH to a certain user equipment 20 does not occur in a certain slot and the transmission of the PSFCH does not occur in a certain subchannel of the slot, the PSCCH or the PSSCH where the user equipment 20 is the transmitting apparatus may be allocated in one symbol or a plurality of symbols from the end of the slot that is a candidate for the PSFCH resource in the subchannel. An overriding operation by which the PSCCH or the PSSCH described above is allocated in the PSFCH resource may be configured by RRC signaling or signaling with DCI, or may be predefined.

In the case of the transmission mode 1, a notification of information indicating whether the PSCCH or the PSSCH can be allocated in one symbol or several symbols from the end of the slot may be transmitted by the SCI or the DCI. In the case of the transmission mode 2, the resource reservation signal may transmit a notification of the information on the allocation of the PSFCH resource, and, by decoding the resource reservation signal by the other user equipment 20, the other user equipment 20 can determine whether the PSCCH or the PSSCH can be allocated in one symbol or a plurality of symbols from the end of the slot.

Figure 13:
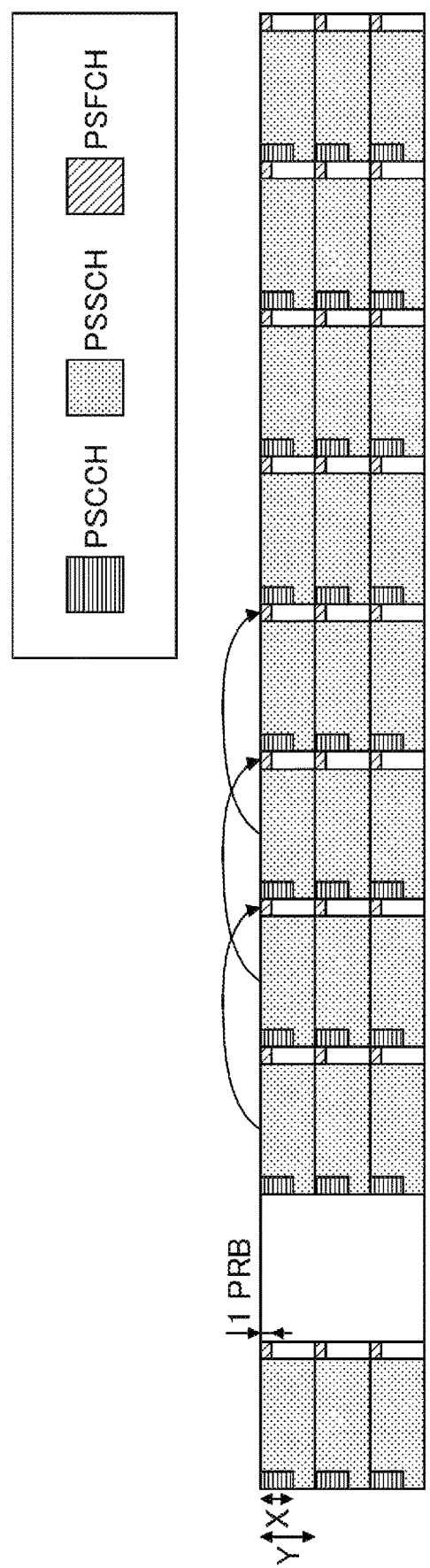
FIG. 13 is a diagram illustrating an example (4) of a channel allocation according to an embodiment of the present invention.

FIG. 13 is a diagram illustrating an example (4) of the channel allocation in an embodiment of the present invention. In FIG. 13, the vertical axis corresponds to the frequency domain, the horizontal axis corresponds to the time domain, and one slot corresponds to the duration from the PSCCH to the next PSFCH. The PSCCH may be allocated in one symbol of the slot head or may be allocated in a plurality of the symbols from the head. The PSFCH may be allocated in the last one symbol of the slot or may be allocated in a plurality of the symbols from the end. As illustrated in FIG. 13, the candidate for the PSFCH resource may be allocated on all the slots. The association of the PSSCH resource with the resource in the frequency domain or the code domain where the PSFCH is allocated may be predefined. The arrows indicate the association between the PSSCH and the PSFCH.

"X" illustrated in FIG. 13 indicates the number of PRBs of the PSCCH, "Y" indicates the number of PRBs of the PSSCH and/or the subchannel, and one PSFCH may be one PRB length. Although FIG. 13 illustrates a case in which the number of PRBs of the PSSCH and the number of PRBs of the subchannel are equal to each other, the present invention is not limited thereto. For example, the PSSCH may be allocated over a plurality of subchannels or the number of the PRBs of the PSSCH may be less than the number of PRBs of one subchannel.

As illustrated in FIG. 13, the PSSCH of each subchannel may be associated with the PSFCH allocated in the same subchannel. The PSFCH may be allocated in the PRB corresponding to a PRB index that is the same as a PRB index of the PSSCH, or a constant PRB offset may be added. The resource in the frequency domain other than the PSFCH resource in the subchannel may be used for the resource reservation signal through the PSCCH.

In a case where the transmission of the PSFCH does not occur in a certain subchannel of a certain slot, the PSCCH or the PSSCH may be allocated in one symbol or a plurality of symbols from the end of the slot that is a candidate for the PSFCH resource in the subchannel. Alternatively, in a case where the transmission of the PSFCH does not occur in a certain slot, the PSCCH or the PSSCH may be allocated in one symbol or a plurality of symbols from the end of the slot that is a candidate for the PSFCH resource. Alternatively, in a case where the transmission of the PSFCH to a certain user equipment 20 does not occur in a certain slot and the transmission of the PSFCH does not occur in a certain subchannel of the slot, the PSCCH or the PSSCH where the user equipment 20 is the transmitting apparatus may be allocated in one symbol or a plurality of symbols from the end of the slot that is a candidate for the PSFCH resource in the subchannel. An overriding operation by which the PSCCH or the PSSCH described above is allocated in the PSFCH resource may be configured by RRC signaling or signaling with DCI, or may be predefined.

In the case of the transmission mode 1, a notification of information indicating whether or not the PSCCH or the PSSCH can be allocated in one symbol or several symbols from the end of the slot may be transmitted by the SCI or the DCI. In the case of the transmission mode 2, the resource reservation signal may transmit a notification of the information on the allocation of the PSFCH resource, and, by decoding the resource reservation signal by another user equipment 20, the other user equipment 20 can determine whether the PSCCH or the PSSCH can be allocated in one symbol or a plurality of symbols from the end of the slot.

Figure 14:
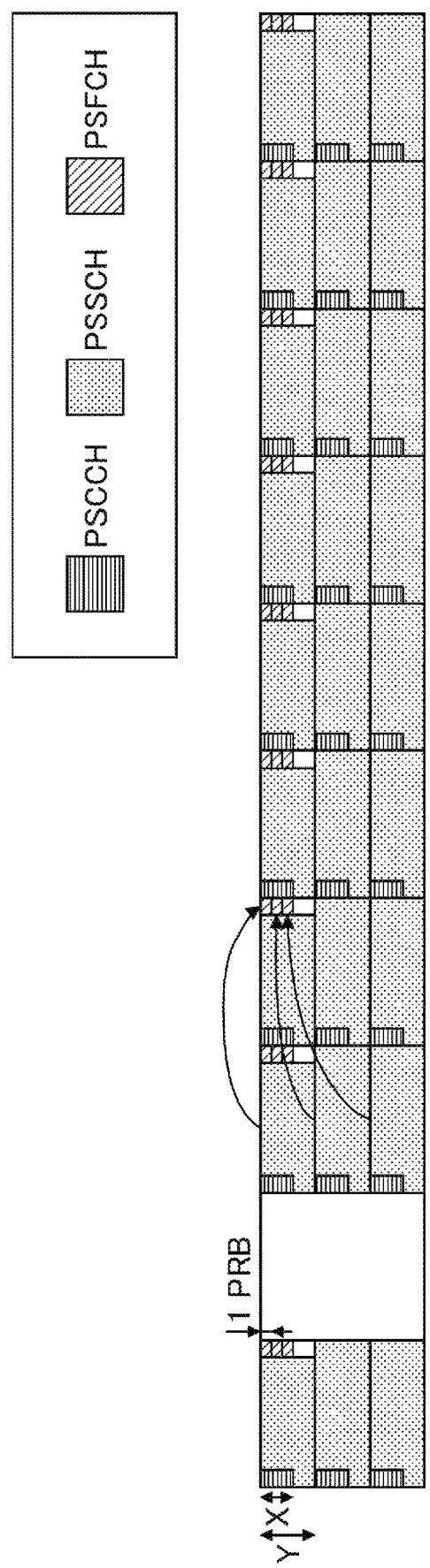
FIG. 14 is a diagram illustrating an example (5) of a channel allocation according to an embodiment of the present invention.

FIG. 14 is a diagram illustrating an example (5) of the channel allocation in an embodiment of the present invention. In FIG. 14, the vertical axis corresponds to the frequency domain, the horizontal axis corresponds to the time domain, and one slot corresponds to the duration from the PSCCH to the next PSFCH. The PSCCH may be allocated in one symbol of the slot head and may be allocated in a plurality of the symbols from the head. The PSFCH may be allocated in the last one symbol of the slot and may be allocated in a plurality of the symbols from the end. As illustrated in FIG. 14, the candidate for the PSFCH resource may be allocated on all the slots. The resource in the frequency domain or the code domain where the PSFCH is allocated may be associated with the PSSCH resource. In addition, in a case where the PSFCH is allocated in a plurality of symbols, the PSFCH resource in the time domain may be associated with the PSSCH resource. The arrows indicate the association between the PSSCH and the PSFCH.

"X" illustrated in FIG. 14 indicates the number of PRBs of the PSCCH, "Y" indicates the number of PRBs of the PSSCH and/or the subchannel, and one PSFCH may be one PRB length. Although FIG. 14 illustrates a case in which the number of PRBs of the PSSCH and the number of PRBs of the subchannel are equal to each other, the present invention is not limited thereto. For example, the PSSCH may be allocated over a plurality of subchannels or the number of PRBs of the PSSCH may be less than the number of PRBs of one subchannel.

As illustrated in FIG. 14, the PSSCHs of all the subchannels may be associated with the PSFCHs allocated in a specific subchannel. The PSFCH may be allocated in the PRB corresponding to a PRB index of the specific subchannel, or, for example, a constant frequency offset may be added on a per subchannel basis. As illustrated in FIG. 14, the PSFCH may be frequency-division-multiplexed within the specific subchannel, or the PSFCH may be code-division-multiplexed although not illustrated. In a subchannel other than the specific subchannel, the PSCCH or the PSSCH may be allocated in the time domain where the PSFCH is allocated.

Figure 15:
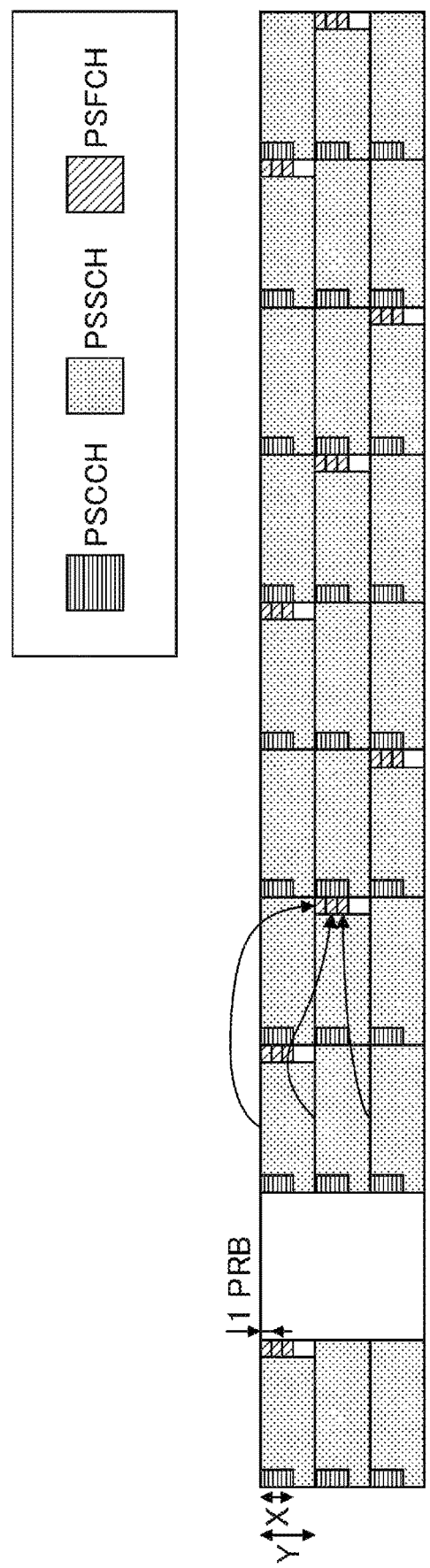
FIG. 15 is a diagram illustrating an example (6) of a channel allocation according to an embodiment of the present invention.

FIG. 15 is a diagram illustrating an example (6) of the channel allocation in an embodiment of the present invention. FIG. 15 is an example in which the PSFCH allocation in FIG. 14 is hopped in units of slots. As illustrated in FIG. 15, a specific subchannel where the PSFCH is allocated may be changed in specific time units (for example, slot units). The pattern of change, that is, a hopping pattern may be configured or predefined. FIG. 15 is an example of the hopping pattern where one subchannel is changed on a per slot basis.

Figure 16:
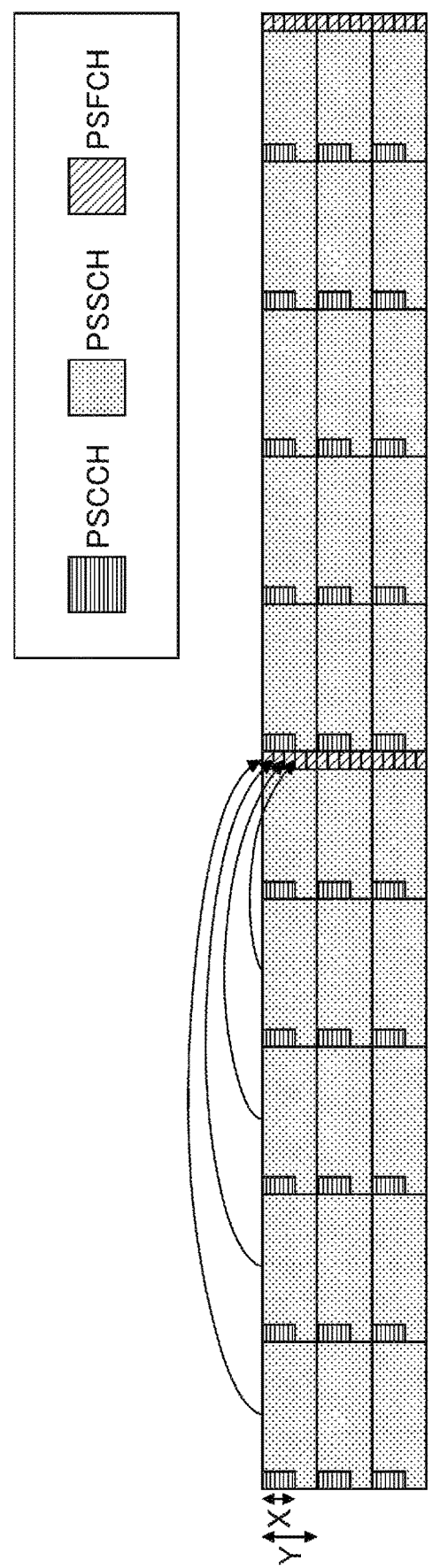
FIG. 16 is a diagram illustrating an example (7) of a channel allocation according to an embodiment of the present invention.

FIG. 16 is a diagram illustrating an example (7) of the channel allocation in an embodiment of the present invention. In FIG. 16, the vertical axis corresponds to the frequency domain, the horizontal axis corresponds to the time domain, and one slot corresponds to the duration from the PSCCH to immediately before the next PSCCH. The PSCCH may be allocated in one symbol of the slot head or may be allocated in a plurality of the symbols from the head. The PSFCH may be allocated in the last one symbol of the slot or may be allocated in a plurality of the symbols from the end. The arrows indicate the association between the PSSCH and the PSFCH. With respect to the time gap between the PSSCH and the PSFCH, as illustrated in FIG. 16, the PSFCH may be allocated in the slot after four slots, after three slots, after two slots, or the next slot of the slot where the PSSCH is allocated.

"X" illustrated in FIG. 16 indicates the number of PRBs of the PSCCH, "Y" indicates the number of PRBs of the PSSCH and/or the subchannel, and one PSFCH may be one PRB length. Although FIG. 16 illustrates a case in which the number of PRBs of the PSSCH and the number of PRBs of the subchannel are equal to each other, the present invention is not limited thereto. For example, the PSSCH may be allocated over a plurality of subchannels or the PRBs of the PSSCH may be less than the number of PRBs of one subchannel.

As illustrated in FIG. 16, the candidate for the PSFCH resource may be allocated in a specific slot of a plurality of the slots. As illustrated in FIG. 16, the PSFCH may be frequency-division-multiplexed, or the PSFCH may be code-division-multiplexed although not illustrated. In a slot other than a specific slot where the PSFCH is allocated, the PSCCH or the PSSCH may be allocated at a symbol position within the specific slot where the PSFCH is allocated. Whether the PSFCH resource is allocated in any slot may be configured or predefined. A notification of the resource in the frequency domain or the code domain where the PSFCH is allocated may be transmitted by signaling (for example, SCI) or the resource in the frequency domain or the code domain where the PSFCH is allocated may be associated with the PSSCH resource. In addition, in a case where the PSFCH is allocated in a plurality of symbols, a notification of the PSFCH resource in the time domain may be transmitted by the SCI or the PSFCH resource in the time domain may be associated with the PSSCH resource.

According to the embodiments described above, upon transmitting or receiving the PSSCH, the transmitting user equipment 20 and the receiving user equipment 20 can identify a PSFCH resource for receiving or transmitting the corresponding HARQ response in a time and frequency domain, or in a time, frequency, and code domain. Furthermore, when PSFCH candidates are allocated in all the slots, the transmitting user equipment 20 and the receiving user equipment 20 can execute a HARQ process with low latency. Furthermore, when PSFCH candidates are allocated only in a specific subchannel or a specific slot, the transmitting user equipment 20 and the receiving user equipment 20 can enhance the resource utilization efficiency.

Namely, in the inter-terminal direct communication, a response related to retransmission control can be appropriately transmitted.

(Device Configuration)

Next, a functional configuration example of each of the base station apparatus 10 and the user equipment 20 that execute the processes and the operation described so far is described. Each of the base station apparatus 10 and the user equipment 20 has the function of implementing the embodiments. Here, each of the base station apparatus 10 and the user equipment 20 may have only some of the functions in the embodiments.

<Base Station Apparatus 10>

Figure 17:
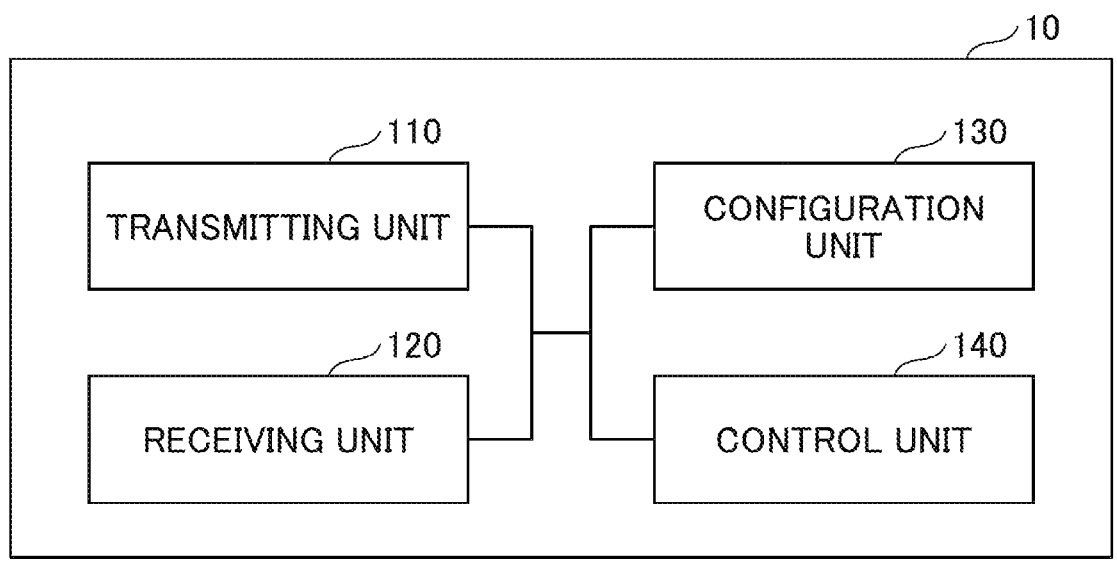
FIG. 17 is a diagram illustrating an example of a functional configuration of a base station apparatus 10 according to an embodiment of the present invention.

FIG. 17 is a diagram illustrating an example of a functional configuration of the base station apparatus 10. As illustrated in FIG. 17, the base station apparatus 10 has a transmitting unit 110, a receiving unit 120, a configuration unit 130, and a control unit 140. The functional configuration illustrated in FIG. 17 is merely an example. As long as the operation according to the embodiments of the present invention can be executed, the functional classification and the name of the functional unit may be any classification and name.

The transmitting unit 110 has a function of generating a signal to be transmitted to the user equipment 20 and transmitting the signal through radio. The receiving unit 120 has a function of receiving various types of signals transmitted from the user equipment 20 and obtaining, for example, information of a higher layer from the received signals. The transmitting unit 110 has a function of transmitting the NR-PSS, the NR-SSS, the NR-PBCH, the DL/UL control signal, the DL reference signal or the like to the user equipment 20.

The configuration unit 130 stores pre-configured configuration information and various types of configuration information to be transmitted to the user equipment 20 in the storage device and reads the configuration information from the storage device if necessary. For example, content of the configuration information is, for example, information related to a configuration of the D2D communication or the like.

As described in the embodiments, the control unit 140 performs a process related to the configuration used for the user equipment 20 to perform the D2D communication. Furthermore, the control unit 140 transmits scheduling for D2D communication to the user equipment 20 through the transmitting unit 110. Furthermore, the control unit 140 determines transmission power of an HARQ response for D2D communication, and the control unit 140 transmits the HARQ response to the user equipment 20 through the transmitting unit 110. A functional unit related to signal transmission in the control unit 140 may be included in the transmitting unit 110, and a functional unit related to signal reception in the control unit 140 may be included in the receiving unit 120.

<User Equipment 20>

Figure 18:
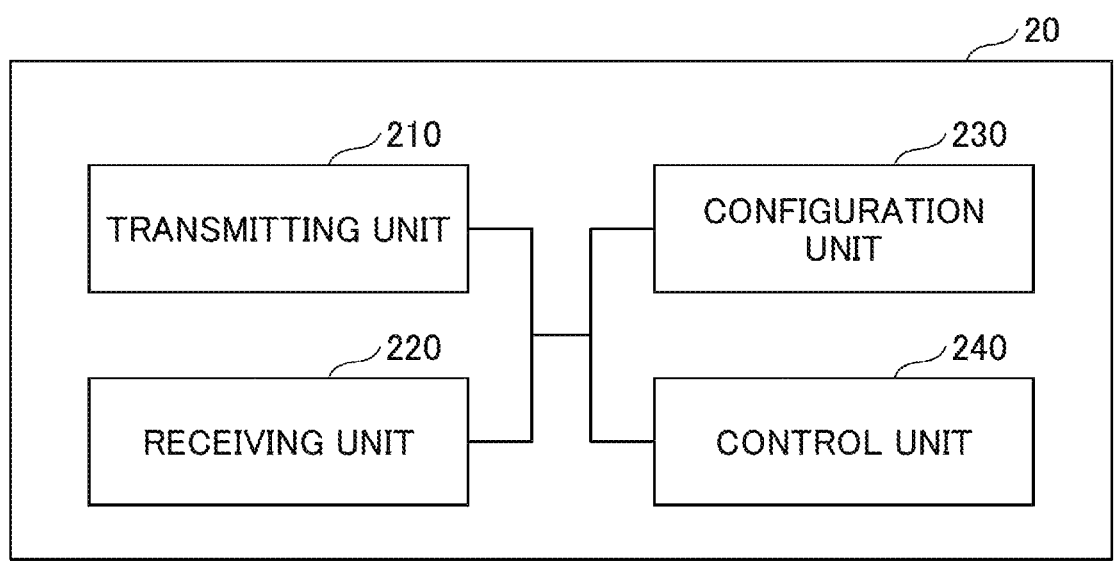
FIG. 18 is a diagram illustrating an example of a functional configuration of a user equipment 20 according to an embodiment of the present invention.

FIG. 18 is a diagram illustrating an example of a functional configuration of the user equipment 20. As illustrated in FIG. 18, the user equipment 20 has a transmitting unit 210, a receiving unit 220, a configuration unit 230, and a control unit 240. The functional configuration illustrated in FIG. 18 is merely an example. As long as the operation according to the embodiments of the present invention can be executed, the functional classification and the name of the functional unit may be any classification and name.

The transmitting unit 210 generates a transmission signal from transmission data and transmits the transmission signal through radio. The receiving unit 220 receives various types of signals through radio, and obtains a signal of a higher layer from a received signal of a physical layer. The receiving unit 220 also has a function of receiving the NR-PSS, the NR-SSS, the NR-PBCH, the DL/UL/SL control signal, a reference signal, or the like transmitted from the base station apparatus 10. Furthermore, for example, the transmitting unit 210 may transmit a physical sidelink control channel (PSCCH), a physical sidelink shared channel (PSSCH), a physical sidelink discovery channel (PSDCH), a physical sidelink broadcast channel (PSBCH), and the like to any other user equipment 20 as the D2D communication, and the receiving unit 220 receives the PSCCH, the PSSCH, the PSDCH, the PSBCH, and the like from any other user equipment 20.

The configuration unit 230 stores various types of configuration information received from the base station apparatus 10 or the user equipment 20 through the receiving unit 220 in the storage device and reads the configuration information from the storage device if necessary. The configuration unit 230 also stores pre-configured configuration information. For example, content of the configuration information is, for example, information related to the configuration of the D2D communication or the like.

The control unit 240 controls D2D communication with other user equipment 20 as described above in the embodiments. Furthermore, the control unit 240 performs a process related to HARQ in D2D communication. The control unit 240 may schedule D2D communication for another user equipment 20. Furthermore, the control unit 240 transmits an HARQ response for D2D communication with configured transmission power or predefined transmission power to the user equipment 20 through the transmitting unit 210. A functional unit related to signal transmission in the control unit 240 may be included in the transmitting unit 210, and a functional unit related to signal reception in the control unit 240 may be included in the receiving unit 220.

<Hardware Configuration>

The block diagrams (FIG. 17 and FIG. 18) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 19:
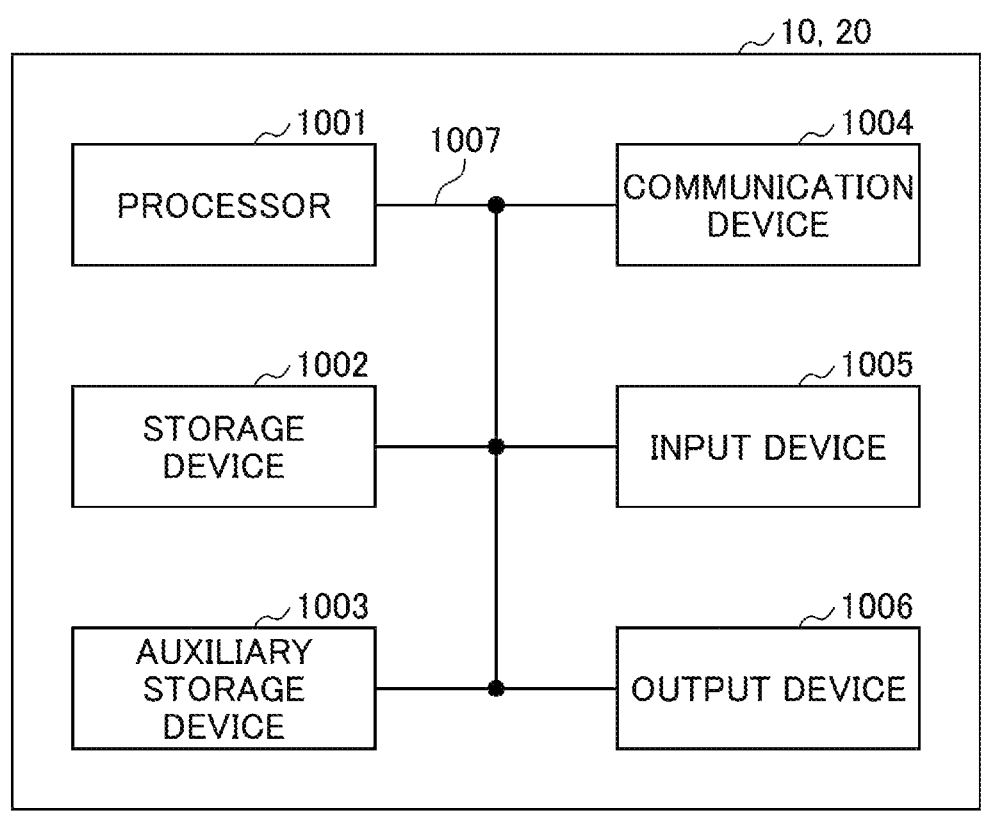
FIG. 19 is a diagram illustrating an example of a hardware configuration of the base station apparatus 10 or the user equipment 20 according to an embodiment of the present invention.

For example, the base station apparatus 10, the user equipment 20, or the like in an embodiment of the present invention may function as a computer for performing a process of radio communication method according to the present disclosure. FIG. 19 is a diagram illustrating an example of a hardware configuration of the base station apparatus 10 and the user equipment 20 according to an embodiment of the present disclosure. Each of the base station apparatus 10 and the user equipment 20 described above may be physically configured as a computer device including a processor 1001, a storage device 1002, an auxiliary storage device 1003, a communication device 1004, an input device 1005, an output device 1006, a bus 1007, and the like.

In the following description, the term "device" can be replaced with a circuit, device, unit, or the like. The hardware configuration of each of the base station apparatus 10 and the user equipment 20 may be configured to include one or more of each device depicted, or may be configured without including some devices.

Each function in each of the base station apparatus 10 and the user equipment 20 is implemented such that predetermined software (program) is read on hardware such as the processor 1001, the storage device 1002 and the like, and the processor 1001 performs an operation and controls communication by the communication device 1004 and at least one of reading and writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like. For example, the above-described control unit 140, the control unit 240, and the like may be implemented by the processor 1001.

Furthermore, the processor 1001 reads a program (program code), a software module, data, or the like from at least one of the auxiliary storage device 1003 and the communication device 1004 out to the storage device 1002, and executes various types of processes according to them. A program causing a computer to execute at least some of the operations described in the above embodiments is used as the program. For example, the control unit 140 of the base station apparatus 10 illustrated in FIG. 17 may be implemented by a control program which is stored in the storage device 1002 and operates on the processor 1001. Furthermore, for example, the control unit 240 of the user equipment 20 illustrated in FIG. 18 may be implemented by a control program which is stored in the storage device 1002 and operates on the processor 1001. Various types of processes are described to be executed by one processor 1001 but may be executed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the communication method according to an embodiment of the present disclosure.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The above-described storage medium may be, for example, a database, a server, or any other appropriate medium including at least one of the storage device 1002 and the auxiliary storage device 1003.

The communication device 1004 is hardware (a transmitting and receiving device) for performing communication between computers via at least one of a wired network and a wireless network and is also referred to as a "network device," a "network controller," a "network card," a "communication module," or the like. The communication device 1004 may be configured to include a high frequency switch, a duplexer, a filter, a frequency synthesizer, and the like to implement at least one of frequency division duplex (FDD) and time division duplex (TDD). For example, transmitting and receiving antennas, an amplifier, a transceiver, a transmission line interface, and the like may be implemented by the communication device 1004. The transceiver may be implemented such that a transmitter and a receiver are physically or logically separated.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the storage device 1002 are connected by the bus 1007 to communicate information with each other. The bus 1007 may be configured with a single bus or may be configured with different buses between the devices.

Furthermore, each of the base station apparatus 10 and the user equipment 20 may be configured to include hardware such as a microprocessor, a digital signal processor (DSP), an application specific integrated circuit (ASIC), a programmable logic device (PLD), or a field programmable gate array (FPGA), or all or some of the functional blocks may be implemented by hardware. For example, the processor 1001 may be implemented by at least one of these hardware components.

Conclusion of the Embodiments

As described above, according to the embodiments of the present invention, there is provided a user equipment includes a transmitting unit that transmits, to another user equipment, data through a physical shared channel; a control unit that identifies a resource in which a channel used for transmission and reception of a response related to retransmission control for the data is allocated; and a receiving unit that receives, from the another user equipment, the response related to the retransmission control for the data through the channel used for transmission and reception of the response related to the retransmission control, wherein the control unit identifies, based on a subchannel in which the physical shared channel is allocated, the resource in which the channel for receiving the response related to the retransmission control is allocated.

According to the above-described configuration, upon transmitting the PSSCH, the transmitting user equipment 20 can identify a PSFCH resource for receiving the corresponding HARQ response in a time and frequency domain, or in a time, frequency, and code domain. Furthermore, when PSFCH candidates are allocated in a specific subchannel, the transmitting user equipment 20 can enhance resource utilization efficiency. Namely, in the inter-terminal direct communication, a response related to retransmission control can be appropriately transmitted.

The transmitting unit may transmit, to the another user equipment through a physical control channel, information indicating a frequency domain resource or a code domain resource in which the channel used for transmission and reception of the response related to the retransmission control is allocated. According to this configuration, upon transmitting or receiving the PSSCH, the user equipment 20 can identify a PSFCH resource for transmitting the corresponding HARQ response in the frequency domain or in the code domain.

The control unit may identify that the resource in which the channel used for transmission and reception of the response related to the retransmission control is allocated is in a frequency domain that is same as a frequency domain of the subchannel. According to this configuration, upon transmitting or receiving the PSSCH, the user equipment 20 can identify a PSFCH resource for transmitting the corresponding HARQ response in a frequency domain.

The control unit may identify that the resource in which the channel used for transmission and reception of the response related to the retransmission control is allocated is in a frequency domain that is same as a frequency domain of a subchannel selected from a plurality of subchannels in which the physical shared channel is allocated. According to this configuration, upon transmitting or receiving the PSSCH, the user equipment 20 can identify a PSFCH resource for transmitting the corresponding HARQ response in a frequency domain.

When a transmission through the channel used for transmission and reception of the response related to the retransmission control does not occur, the transmitting unit may transmit a physical shared channel or a physical control channel in a resource in which the transmission does not occur and in which the channel used for transmission and reception of the response related to the retransmission control is allocated. According to this configuration, by transmitting the PSSCH or the PSCCH with the PSFCH resource that is not used, the user equipment 20 can enhance the resource utilization efficiency.

Furthermore, according to the embodiments of the present invention, there is provided a user equipment including a receiving unit that receives, from another user equipment, data through a physical shared channel; a control unit that identifies a resource in which a channel used for transmission and reception of a response related to retransmission control for the data is allocated; and a transmitting unit that transmits, to the another user equipment, the response related to the retransmission control for the data through the channel used for transmission and reception of the response related to the retransmission control, wherein the control unit identifies, based on a subchannel in which the physical shared channel is allocated, the resource in which the channel for receiving the response related to the retransmission control is allocated.

According to the above-described configuration, upon receiving the PSSCH, the receiving user equipment 20 can identify a PSFCH resource for transmitting the corresponding HARQ response in a time and frequency domain, or in a time, frequency, and code domain. Furthermore, when PSFCH candidates are allocated in a specific subchannel, the receiving user equipment 20 can enhance resource utilization efficiency. Namely, in the inter-terminal direct communication, a response related to retransmission control can be appropriately transmitted.

Supplemental Embodiment

The embodiments of the present invention are described above, but the disclosed invention is not limited to the above-described embodiments, and those skilled in the art would understand various modified examples, revised examples, alternative examples, substitution examples, and the like. In order to facilitate understanding of the present invention, specific numerical value examples are used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no contradiction. For the sake of convenience of processing description, the base station apparatus 10 and the user equipment 20 are described using the functional block diagrams, but such devices may be implemented by hardware, software, or a combination thereof. Software executed by the processor included in the base station apparatus 10 according to the embodiments of the present invention and software executed by the processor included in the user equipment 20 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspects or embodiments described in the present disclosure and may be provided by any other method. For example, the notification of information may be provided by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the present disclosure may be applied to at least one of Long Term Evolution (LTE), LTE-advanced (LTE-A), SUPER 3G, IMT-advanced, 4th generation mobile communication system (4G), 5th generation mobile communication system (5G), Future Radio Access (FRA), new Radio (NR), W-CDMA (registered trademark), GSM (registered trademark), CDMA 2000, Ultra Mobile Broadband (UMB), IEEE 802.11 (Wi-Fi(registered trademark)), IEEE 802.16 (WiMAX(registered trademark)), IEEE 802.20, Ultra-WideBand (UWB), Bluetooth(registered trademark), a system using any other appropriate system, and next generation systems extended based on these standards. Furthermore, a plurality of systems (e.g., a combination of at least one of LTE and LTE-A with 5G) may be combined to be applied.

The processing procedures, the sequences, the flowcharts, and the like of the respective aspects/embodiments described in this specification may be reversed in order provided that there is no contradiction. For example, the method described in the present disclosure presents elements of various steps with an exemplary order and is not limited to a presented specific order.

In this specification, a specific operation to be performed by the base station apparatus 10 may be performed by an upper node in some cases. In the network including one or more network nodes including the base station apparatus 10, various operations performed for communication with the user equipment 20 can be obviously performed by at least one of the base station apparatus 10 and any network node (for example, an MME, an S-GW, or the like is considered, but it is not limited thereto) other than the base station apparatus 10. A case is exemplified above in which there is one network node other than the base station apparatus 10. The one network node may be a combination of a plurality of other network nodes (e.g., MME and S-GW).

Information, a signal, or the like described in the present disclosure may be output from an upper layer (or a lower layer) to a lower layer (or an upper layer). Information, a signal, or the like described in the present disclosure may be input and output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination the present disclosure may be performed in accordance with a value (0 or 1) indicated by one bit, may be performed in accordance with a Boolean value (true or false), or may be performed by a comparison of numerical values (for example, a comparison with a predetermined value).

Software can be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, information, and the like may be transmitted and received via a transmission medium. For example, when software is transmitted from a web site, a server, or any other remote source using a wired technology (such as a coaxial cable, a fiber optic cable, a twisted pair, or a digital subscriber line (DSL: Digital Subscriber Line)) and a radio technology (such as infrared rays or a microwave), at least one of the wired technology and the radio technology are included in a definition of a transmission medium.

Information, signals, and the like described in this disclosure may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or any combination thereof.

The terms described in the present disclosure and terms necessary for understanding the present disclosure may be replaced with terms having the same or similar meanings. For example, at least one of a channel and a symbol may be a signal. Further, a signal may be a message. Further, a component carrier (CC: Component Carrier) may be referred to as a "carrier frequency," a "cell," or the like.

The terms "system" and "network" used in the present disclosure are used interchangeably.

Further, information, parameters, and the like described in the present disclosure may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in the present disclosure. Since various channels (for example, a PUCCH, a PDCCH, and the like) and information elements can be identified by suitable names, various names assigned to the various channels and the information elements are not limited in any respect.

In the present disclosure, the terms "base station (BS)," "radio base station," "base station apparatus," "fixed station," "Node B," "eNode B (eNB)," "gNodeB (gNB)," "access point," "transmission point," "reception point," "transmission/reception point," "cell," "sector," "cell group," "carrier," "component carrier," and the like can be used interchangeably. The base stations may also be indicated by terms such as a macrocell, a small cell, a femtocell, and a picocell.

The base station eNB can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (a remote radio head (RRH)). The term "cell" or "sector" refers to the whole or a part of the coverage area of at least one of the base station and the base station subsystem that performs a communication service in the coverage.

In the present disclosure, the terms "mobile station (MS)," "user terminal," "user equipment (UE)," "terminal," and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmitting device, a receiving device, a communication device, or the like. At least one of the base station and the mobile station may be a device installed in a mobile body, a mobile body itself, or the like. The mobile body may be a vehicle (for example, a car, an airplane, or the like), an unmanned body that moves (for example, a drone, an autonomous car or the like), or a robot (manned type or unmanned type). At least one of the base station and the mobile station includes a device which need not move during a communication operation. For example, at least one of the base station and the mobile station may be an Internet of things (IoT) device such as a sensor.

Further, the base station in the present disclosure may be replaced with a user terminal. For example, each aspect/embodiment of the present disclosure may be applied to a configuration in which communication between the base station and the user terminal is replaced with communication between a plurality of units of user equipment 20 (for example, which may be referred to as device-to-device (D2D) or vehicle-to-everything (V2X)). In this case, the user equipment 20 may have the functions of the base station apparatus 10 described above. Further, the terms "uplink" and "downlink" may be replaced with terms (for example, "side") corresponding to inter-terminal communication. For example, an uplink channel, a downlink channel, or the like may be replaced with side channels.

Similarly, the user terminal in the present disclosure may be replaced with the base station. In this case, the base station may have the functions of the above-mentioned user terminal.

The terms "determine (determining)" and "decide (determining)" used in this disclosure may include various types of operations. For example, "determining" and "deciding" may include deeming that a result of judging, calculating, computing, processing, deriving, investigating, looking up (search, inquiry) (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. "Determine (decision)" may be replaced with "assuming," "expecting" "considering," and so forth.

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. For example, "connection" may be replaced with "access." In a case in which used in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS and may be referred to as a pilot, depending on a standard to be applied.

A phrase "based on" used in the present disclosure is not limited to "based only on" unless otherwise stated. In other words, a phrase "based on" means both "based only on" and "based on at least."

Any reference to an element using a designation such as "first," "second," or the like used in the present disclosure does not generally restrict quantities or an order of those elements. Such designations can be used in the present disclosure as a convenient method of distinguishing two or more elements. Thus, reference to the first and second elements does not mean that only two elements can be adopted there, or the first element must precede the second element in a certain form.

Furthermore, "means" in the configuration of each of the above-described devices may be replaced with "unit," "circuit," "device," or the like.

In a case in which "include," "including," and variations thereof are used in the present disclosure, these terms are intended to be comprehensive, similar to a term "provided with (comprising)." Further, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

The numerology may be a communication parameter applied to at least one of transmission and reception of a certain signal or channel. For example, the numerology may indicate at least one of a subcarrier spacing (SCS), a bandwidth, a symbol length, a cyclic prefix length, a transmission time interval (TTI), a number of symbols per TTI, a radio frame configuration, a specific filtering process performed in the frequency domain by a transceiver, a specific windowing process performed in the time domain by a transceiver, and the like.

The slot may include one or more symbols (orthogonal frequency division multiplexing (OFDM) symbols, single carrier frequency division multiple access (SC-FDMA) symbols, or the like) in the time domain. The slot may be a time unit based on the numerology.

The slot may include a plurality of mini slots. Each mini slot may include one or more symbols in the time domain. Further, the mini slot may be referred to as a sub-slot. The mini slot may include fewer symbols than a slot. A PDSCH (or PUSCH) transmitted in units of times greater than the mini slot may be referred to as a PDSCH (or PUSCH) mapping type A. A PDSCH (or PUSCH) transmitted using a mini slot may be referred to as a PDSCH (or PUSCH) mapping type B.

All of a radio frame, a subframe, a slot, a mini slot, and a symbol indicates a time unit for transmitting a signal. As a radio frame, a subframe, a slot, a mini slot, and a symbol, different names respectively corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in the existing LTE, may be a period shorter than 1 ms (for example, 1 to 13 symbols), or may be referred to as a period longer than 1 ms. A unit representing the TTI may be referred to as slot, a mini slot, or the like instead of the subframe.

Here, for example, the TTI refers to a minimum time unit of scheduling in radio communication. For example, in the LTE system, the base station performs scheduling of assigning a radio resource (a frequency bandwidth, a transmission power, or the like which can be used in each user equipment 20) to each user equipment 20 in units of TTIs. The definition of the TTI is not limited thereto.

The TTI may be a transmission time unit such as a channel coded data packet (transport block), a code block, or a code word, or may be a processing unit such as scheduling or link adaptation. Furthermore, when a TTI is provided, a time interval (for example, the number of symbols) in which a transport block, a code block, a code word, or the like is actually mapped may be shorter than the TTI.

Note that, when one slot or one mini slot is referred to as a TTI, one or more TTIs (that is, one or more slots or one or more mini slots) may be a minimum time unit of scheduling. Further, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than the common TTI may be referred to as a reduced TTI, a short TTI, a partial TTI (a partial or fractional TTI), a reduced subframe, a short subframe, a mini slot, a sub slot, a slot, or the like.

Note that, a long TTI (for example, a common TTI, a subframe, or the like) may be replaced with a TTI having a time length exceeding 1 ms, and a short TTI (for example, a reduced TTI or the like) may be replaced with a TTI having a TTI length which is less than a TTI length of a long TTI and equal to or more than 1 ms.

The resource block (RB) is a resource allocation unit in the time domain and the frequency domain and may include one or more consecutive subcarriers in the frequency domain. The number of subcarriers included in an RB may be the same irrespective of a numerology and may be, for example, 12. The number of subcarriers included in an RB may be determined based on a numerology.

Furthermore, a time domain of an RB may include one or more symbols and may be a length of one slot, one mini slot, one subframe, or one TTI. Each of one TTI, one subframe, or the like may be formed of one or more resource blocks.

Furthermore, one or more RBs may be referred to as a physical resource block (PRB), a subcarrier group (SCG), a resource element group (REG), a PRB pair, an RB pair, or the like.

Furthermore, a resource block may be formed of one or more resource elements (RE). For example, one RE may be a radio resource region of one subcarrier and one symbol.

A bandwidth part (BWP) (which may be referred to as a partial bandwidth) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include a BWP for UL (UL BWP) and a BWP for DL (DL BWP). In a UE, one or more BWPs may be configured within one carrier.

At least one of configured BWPs may be active, and it may not be assumed that the UE transmits and receives a predetermined signal/channel outside an active BWP. Further, a "cell," a "carrier," or the like in the present disclosure may be replaced with a "BWP."

Structures of the radio frame, the sub frame, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, a symbol length, a cyclic prefix (CP) length, and the like can be variously changed.

In the entire present disclosure, for example, when an article such as "a," "an," or "the" in English is added by a translation, the present disclosure may include a case in which a noun following the article is the plural.

In the present disclosure, a term "A and B are different" may mean "A and B are different from each other." Furthermore, the term may mean "each of A and B is different from C." Terms such as "separated," "coupled," or the like may also be interpreted in similarly to "different."

Each aspect/embodiment described in this specification may be used alone, in combination, or may be switched in accordance with the execution. Furthermore, notification of predetermined information (for example, notification of "being X") is not limited to an explicit method, and may be performed by an implicit method (e.g., not performing notification of the predetermined information).

Note that, in the present disclosure, the HARQ response is an example of a response related to retransmission control. PSSCH is an example of a physical shared channel. PSFCH is an example of a channel used for transmission and reception of a response related to retransmission control. PSCCH is an example of a physical control channel.

Although the present disclosure is described above in detail, it is obvious to those skilled in the art that the present disclosure is not limited to the embodiments described in the present disclosure. The present disclosure may be implemented as revised and modified embodiments without departing from the gist and scope of the present disclosure as set forth in claims. Accordingly, the description of the present disclosure is for the purpose of illustration and does not have any restrictive meaning to the present disclosure.

LIST OF REFERENCE SYMBOLS 10 base station apparatus
110 transmitting unit
120 receiving unit
130 configuration unit
140 control unit
20 user equipment
210 transmitting unit
220 receiving unit
230 configuration unit
240 control unit
1001 processor
1002 storage device
1003 auxiliary storage device
1004 communication device
1005 input device
1006 output device

The invention claimed is:

1. A terminal comprising:
a receiver that receives a physical shared channel transmitted from another terminal;
a controller that determines, from among multiple candidates for a resource for transmitting a feedback channel, the resource at which the feedback channel including a HARQ response corresponding to the physical shared channel is to be allocated, the resource including a code domain resource, based on sidelink control information (SCI), in response reception of the physical shared channel; and
a transmitter that transmits, to the another terminal, the feedback channel by using the determined resource,
wherein multiple slots at which the multiple candidates for the resource are allocated are consecutive in a time domain, and, in a frequency domain, the multiple candidates for the resource are allocated to a single subchannel that is used to transmit the physical shared channel, and
wherein the controller determines a slot at which the feedback channel is to be allocated based on configuration information indicating a time gap between the physical shared channel and the feedback channel, the configuration information indicating the time gap being provided by higher layer signaling.

2. A communication method executed by a terminal, the method comprising:
receiving a physical shared channel transmitted from another terminal;
determining, from among multiple candidates for a resource for transmitting a feedback channel, the resource at which the feedback channel including a HARQ response corresponding to the physical shared channel is to be allocated, the resource including a code domain resource, based on sidelink control information (SCI), in response reception of the physical shared channel; and
transmitting, to the another terminal, the feedback channel by using the determined resource,
wherein multiple slots at which the multiple candidates for the resource are allocated are consecutive in a time domain, and, in a frequency domain, the multiple candidates for the resource are allocated to a single subchannel that is used to transmit the physical shared channel, and
wherein the terminal determines a slot at which the feedback channel is to be allocated based on configuration information indicating a time gap between the physical shared channel and the feedback channel, the configuration information indicating the time gap being provided by higher layer signaling.

3. A radio communication system comprising:
a first terminal; and
a second terminal,
wherein the first terminal includes
a receiver that receives a physical shared channel transmitted from the second terminal;
a controller that determines, from among multiple candidates for a resource for transmitting a feedback channel, the resource at which the feedback channel including a HARQ response corresponding to the physical shared channel is to be allocated, the resource including a code domain resource, based on sidelink control information (SCI), in response reception of the physical shared channel; and
a transmitter that transmits, to the second terminal, the feedback channel by using the determined resource,
wherein multiple slots at which the multiple candidates for the resource are allocated are consecutive in a time domain, and, in a frequency domain, the multiple candidates for the resource are allocated to a single subchannel that is used to transmit the physical shared channel,
wherein the first terminal determines a slot at which the feedback channel is to be allocated based on configuration information indicating a time gap between the physical shared channel and the feedback channel, the configuration information indicating the time gap being provided by higher layer signaling, and
wherein the second terminal receives the feedback channel from the first terminal.

* * * * *